May 26, 1942. F. G. BLOCH 2,284,082
BIMETALLIC ELEMENT
Filed July 8, 1939
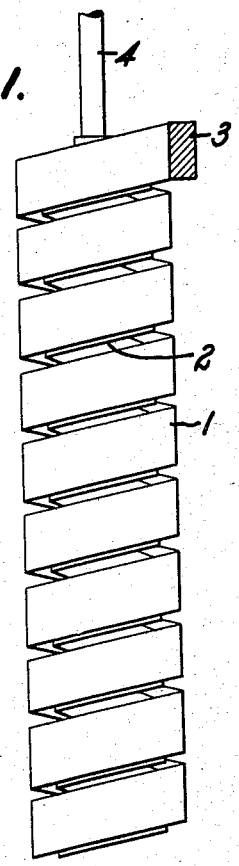
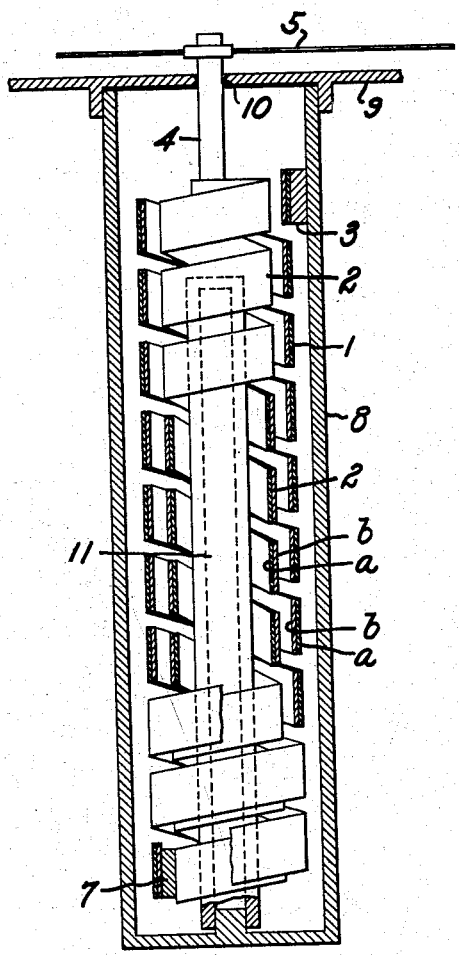
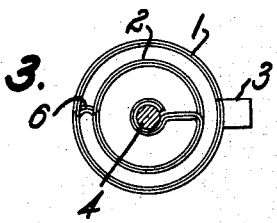
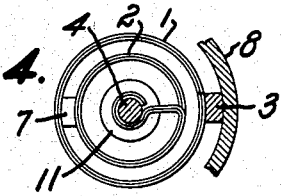
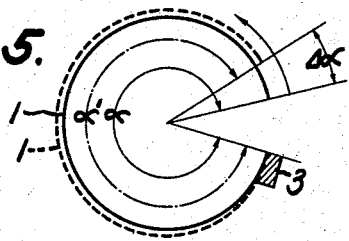
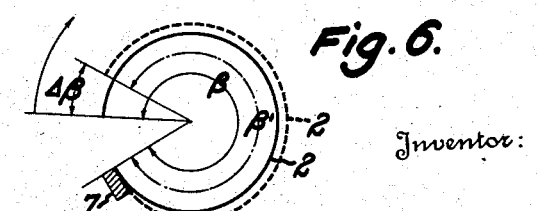
Inventor:
Franz Georg Bloch,
By Potter, Pierce & Scheffler,
Attorneys.

Patented May 26, 1942

2,284,082

UNITED STATES PATENT OFFICE 2,284,082

BIMETALLIC ELEMENT

Franz Georg Bloch, Le Sentier, Switzerland
Application July 8, 1939, Serial No. 283,511
In Czechoslovakia May 30, 1938

2 Claims. (Cl. 297—16)

This invention relates to bimetallic elements and particularly to coiled or helical bimetallic elements for use in thermometers, thermo-electric telemetric systems, thermal switches and the like.

Coils formed from bimetallic strip material exhibit a slight increase in diameter in the course of time due to the gradual relief of secondary stresses and strains resulting from the process of manufacture. A sensitive thermometer having a bimetallic helix of 5 mm. diameter for displacing a pointer over an arcuate scale may show an error of several angular degrees upon an increase of the coil diameter of about 0.1 mm. The errors of the several coils are cumulative in thermometers, such as described in my prior Patent No. 1,970,219, in which a single length of bimetallic strip material is wound to form inner and outer helices. This drift in the calibration of the apparatus may be reduced by employing relatively heavy strip material but this expedient is often objectionable in view of the slow response of thermal elements of high heat capacity.

An object of this invention is to provide thermally responsive devices, including a plurality of bimetallic elements, that maintain substantially the same operating characteristics over long periods. An object is to provide thermally-responsive elements that include a plurality of coils of bimetallic strip material of such design and so connected that dimensional changes in the coils due to temperature variations produce additive effects while dimensional changes due to secondary stresses in the individual bimetallic coils neutralize each other. An object is to provide a temperature responsive system including at least two coils of bimetallic strip material that are mechanically connected to produce additive displacements of a pointer or the like as each coil changes in dimension with temperature changes, the metal of the higher rate of expansion being at the exterior of one coil and at the interior of another. More specifically, an object is to provide a temperature responsive system including a single strip of bimetallic material having portions thereof wound as two coils, the relative locations of the two metals being reversed in the two coils, a fixed support for the end of one coil, and a pointer or the like secured to the end of the other coil. A further object is to provide a bimetallic element comprising at least two concentric coils of bimetallic strips wound in the same sense but with the relative location of the component metals reversed, a mechanical connection between adjacent ends of the pair of coils, a support for the other end of one coil, a pointer at the free end of the second coil, a casing enclosing the coils, and a body of low heat capacity and high heat conductivity within the coils.

These and other objects and advantages of the invention will be apparent from the following specification when taken with the accompanying drawing in which:

Fig. 1 is a side elevation of a strain-compensated bimetallic assembly embodying the invention;

Fig. 2 is a fragmentary side elevation, with parts in section, of a bimetallic strip thermometer embodying the invention;

Figs. 3 and 4 are plan views of alternative constructions of the bimetallic coils shown in Fig. 1; and Figs. 5 and 6 are schematic diagrams illustrating the strain-produced dimensional changes in the outer and inner bimetallic coils, respectively, of assemblies such as shown in Figs. 1 and 2.

In the drawing, the reference numerals 1 and 2 identify two coaxial and concentric coils of bimetallic strip material, the upper end of the outer coil 1 being anchored to a supporting member 3 and the upper end of the inner coil 2 carrying a staff 4 on which a pointer 5 or other control or indicating member is mounted. The lower ends of the bimetallic coils are mechanically coupled in such manner that temperature-produced changes in the dimensions of the two coils produce additive angular displacements of the staff 4 and the member 5 that is mounted thereon. As shown in Fig. 3, the coils 1 and 2 are formed from a single strip of bimetallic material and the intermediate section 6 of the strip thus constitutes the mechanical connection between the coils. Alternatively, as shown in Fig. 4, the coils 1 and 2 may be formed from individual strips which are each secured, by soldering or welding, to the coupling member 7.

In accordance with this invention, the helical coils 1 and 2 are wound in the same sense, but the component metal layers $a$, $b$ of the metallic strips are reversely arranged in the coils 1 and 2. This reversal of the relative locations of the components of the bimetallic strips is obtained by folding the bimetallic strip back upon itself at the junction section 6 in the embodiment of Figs. 1 and 3. The geometry of the multiple helix thus differs from that of the thermostats of my prior patent in which there is no reversal in the relative location of the bimetallic strip components in adjacent helices, and in which the adjacent helices are wound in opposite sense and joined by a spiral connecting section corresponding generally to the reverse bend 6 of the present construction. Temperature changes result in a cumulative angular displacement of the staff 4 when coils 1 and 2 are mechanically connected as above described.

In the thermometer assembly of Fig. 2, the supporting member 3 for the outer coil 1 is secured to a tubular shell 8 of good heat conductivity that is fixed to a disk or plate 9 that carries an arcuate scale, not shown, of temperature graduations over which the pointer 5 is displaced in accordance with the temperature-produced changes in the coils 1 and 2. The staff 4 extends through an opening 10 in the plate 9 which forms a guide and loose bearing for the staff. A thin tubular shell 11 of low heat capacity and high thermal conductivity is preferably arranged within the inner helical coil 2. The lower end of the shell 11 fits over and is in good heat transfer relationship to a boss at the inner surface of the end wall of the outer shell 8. The shell 11 provides a heat transfer path for quickly establishing within the inner helix 2 the temperature that is established at the cylindrical and end walls of the shell 8 by the medium to which the shell 8 is exposed. The thermometer thus responds quickly to any change in the temperature of the medium as the same component metal $a$ of the bimetallic strip is adjacent both the outer shell 8 and the inner shell 11.

The manner in which the strain-produced variations in the diameters of the outer and inner helical coils 1, 2 is neutralized will be apparent from a consideration of the schematic views, Figs. 5 and 6. The relief of winding strains is always in the same sense and results in an increase in the coil diameter, whether the component metal of higher thermal expansion rate is at the inner or at the outer side of the coil. For simplicity of explanation, the angular extent of the coil 1, as initially formed, is assumed to be equal to an angle $\alpha$ of less than 360°. In the relief of the secondary strains that are set up in the winding of the coil 1, the diameter of the coil increases and the angular spread of the coil is thereby decreased to some smaller angle $\alpha'$, i. e. the free end of the coil 1 is displaced counterclockwise by the increment $\Delta\alpha$. The coil 2, which is wound counterclockwise as viewed from its point of support 7, has an initial angular spread $\beta$ that is decreased to the value $\beta'$ as the diameter of the coil is increased by the relief of secondary strains, thus displacing the free end of the coil 2 clockwise by the increment $\Delta\beta$. The lengths of the coils 1, 2, their relative diameters and the thickness of the strip material may be so related that $\Delta\alpha$ is equal to $\Delta\beta$.

Thermal elements that are compensated in this manner may be of relatively light weight in comparison with the prior devices in which approximately constant calibration was obtained by employing strip material of a strength far in excess of that required for mechanical stability of the system. The new elements therefore have a low heat inertia and respond quickly to temperature changes. Full advantage of the low heat inertia is obtained when, as described above, a body of low heat capacity and high thermal conductivity is located within the inner coil.

It is to be understood that the invention is not restricted to the particular constructions herein shown and described as the compensation method may be applied to spiral coils as well as helical coils, to assemblies including more than two coils, and to assemblies in which the coils are axially spaced or laterally spaced from each other.

I claim:

1. A temperature responsive device comprising a plurality of concentric helical coils of bimetallic strip material wound in the same sense and with the component metals of the strip material reversely arranged in said coils, a shell enclosing said coils, means securing an end of one coil to said shell, means mechanically connecting the other end of that coil to an end of another coil, a member connected to the second end of said other coil, and a body of low heat capacity and high thermal conductivity enclosed within said shell and located within the innermost of said coils and in good heat transfer relation to said shell.

2. A temperature responsive device as claimed in claim 1, wherein said coils comprise a single strip of bimetallic material reversely bent upon itself at an intermediate portion.

FRANZ GEORG BLOCH.